United States Patent

Guillon et al.

[11] Patent Number: 5,613,023
[45] Date of Patent: Mar. 18, 1997

[54] METHOD OF MODIFYING THE LONGITUDINAL DISTRIBUTION OF THE PITCH OF A DIFFRACTION GRATING, AND A METHOD OF MAKING SUCH A GRATING IN AN OPTICAL WAVEGUIDE

[75] Inventors: Jean Guillon, La Ferte Alais; David Macia, Paris; Isabelle Riant; Pierre Sansonetti, both of Palaiseau, all of France

[73] Assignee: Alcatel Fibres Optiques, Bezons Cedex, France

[21] Appl. No.: 510,269

[22] Filed: Aug. 2, 1995

[30] Foreign Application Priority Data

Aug. 4, 1994 [FR] France .................. 94 09705

[51] Int. Cl.⁶ .................................................. G02B 6/34
[52] U.S. Cl. ..................................................... 385/37
[58] Field of Search ................................... 385/31, 37

[56] References Cited

U.S. PATENT DOCUMENTS

| | | | |
|---|---|---|---|
| 4,474,427 | 10/1984 | Hill et al. | 385/37 |
| 4,636,031 | 1/1987 | Schmadel, Jr. et al. | 385/37 |
| 5,321,257 | 6/1994 | Danisch | 385/37 |

FOREIGN PATENT DOCUMENTS

WO8601303   2/1986   WIPO .

OTHER PUBLICATIONS

"Strain Gradient Chrip of Fibre Bragg Gratings" by Hill et al., vol. 30. No. 14, Jul. 7, 1994, pp. 1172–1174.

*Electronics Letters.*, vol. 30, No. 14, 7 Jul. 1994, Enage GB, pp. 1172–1174, P. C. Hill, "Strain Gradient Chirp of Fibre Bragg Gratings".

*IEEE Photonics Technology Letters,* vol. 6, No. 7, Jul. 1994, New York, US, pp. 839–841, Q. Zhang et al, pp. 839–841, Q. Zhang et al, "Tuning Bragg wavelength by writing gratiings on prestrained fibers".

*Primary Examiner*—Akm E. Ullah
*Attorney, Agent, or Firm*—Sughrue, Mion, Zinn, Macpeak & Seas

[57] ABSTRACT

To modify the longitudinal pitch distribution of a diffraction grating, longitudinal dimensional variation is imparted, over time, to a support along the entire length of a line on which said support carries, at least indirectly, a succession of diffraction elements of the grating. By way of example, the support is an auxiliary part on which an optical fiber is stuck, said fiber including said grating. An elongation coefficient $dl/l$ represents the local relative value of dimensional variation. This value varies along said line. The invention is particularly applicable to making variable pitch light-refracting filters in optical fiber telecommunications systems.

10 Claims, 2 Drawing Sheets

METHOD OF MODIFYING THE LONGITUDINAL DISTRIBUTION OF THE PITCH OF A DIFFRACTION GRATING, AND A METHOD OF MAKING SUCH A GRATING IN AN OPTICAL WAVEGUIDE

The present invention relates in particular to a method enabling the longitudinal distribution of the pitch in a diffraction grating to be modified over time. It also relates to making such a grating in an optical waveguide such as an optical fiber, the grating then typically constituting a Bragg reflector. In such an implementation, the invention is applicable when the pitch of the grating is required to vary along the waveguide in accordance with a predetermined relationship.

BACKGROUND OF THE INVENTION

A grating made in this way is said to be of varying pitch, while a grating whose pitch remains the same over its entire length is said to be of fixed pitch. A grating in which the optical phase shift is identical over the pitch of the entire grating is said to be a grating of fixed phase shift. In the context of optical fiber information transmission systems, a varying pitch may be desirable so as to give the grating either a broader spectrum band, or else to achieve spectrum dispersion that is adapted to a particular requirement such as compensating for the chromatic dispersion of a line fiber.

In the present invention, the grating may be induced in the fiber using an initial pitch that is fixed, with said pitch subsequently being modified locally so as to obtain a final pitch having the desired variation. Pitch modification over time may also be useful in correcting interfering variations in pitch that can arise along a grating while the grating is being induced to the fiber, e.g. when it is desired to make a grating of fixed phase shift.

The grating is typically induced by phase shifting of a photorefractive effect that is achieved by interference between two ultraviolet light beams. Interfering variations in pitch can be the result, for example, of Gaussian distribution of light intensity in the inducing beams.

Various ways in which a grating can be induced by the photorefractive effect are described in an article entitled "Photoinduced Bragg gratings in optical fibers" by W. Morey, G. A. Ball, G. Meltz, published in Optics & Photonics News, February 1994, pp. 8–14. Another technique using a mirror is described in an article entitled "Réalisation d'un filtre de Bragg photoinscrit dans une fibre optique à l'aide d'un montage interférométrique constitué d'un miroir unique"["Making a photoinduced Bragg filter in an optical fiber by means of an interferometer setup using a single mirror"], by I. Riant, P. Sansonetti, H. Février, S. Artigaud, 13èmes Journées d'Optique Guidée; 1993.

A first method is known for modifying the pitch of the grating induced in an optical fiber over the course of time. That method consists in subjecting the fiber to traction, thereby lengthening the fiber elastically and thus increasing the pitch of the grating. All the gaps between successive diffraction elements are then increased by the same amount so that if the initial pitch was constant, then the final pitch as obtained by that method is also constant.

A second known method is used to inscribe a varying pitch grating directly in a fiber by the photorefractive effect. Grating pitch variation is the result of variation in the width of interference fringes along the length of the waveguide. That second method is described in "Fiber dispersion compensation using a chirped in-fiber Bragg grating" by J. Williams, I. Barnian, K. Syndent, and N. J. Drau, Elect. Lett., 1994, Vol. 30, No. 12, pp. 985–987.

A third known method has been proposed for achieving the same object by means of a system using interference fringes of constant width. An optical waveguide in which a grating is to be induced is carried on a curved line of a support so that the inclination of light rays relative to the axis of the waveguide varies along the length of the waveguide. That third known method is described in patent document WO-A-86 01303 (United Teleologies). It is also described in the context of an optical filter in the article entitled "Chirped gratings produced in photosensitive optical fibers by fiber deformation during exposure", Elect. Lett., 1994, Vol. 30, No. 5, pp. 440–442.

A fourth known method is described in the document U.S. Pat. No. 4,474,427 (Hill et al.). That document teaches firstly how to achieve time variation of pitch in a grating induced in an optical fiber. That variation is obtained by subjecting the fiber to mechanical tension. The document also teaches how to achieve longitudinal pitch variation by causing the tension to vary longitudinally: for that purpose the fiber is wound on a conical mandrel.

A fifth known method is described in the document "Strain gradient chirp of fiber Bragg gratings" by P. C. Hill, published in Electronics Letters, Vol. 30, No. 14, Jul. 7, 1994, pp. 1172–1174. To achieve longitudinally varying tension in an optical fiber, a tension force is applied to one end of fiber and it is taken up in a longitudinally progressive manner by an adhesive that is subject to creep under tension.

OBJECTS AND SUMMARY OF THE INVENTION

Particular objects of the present invention are to make the following simple:

modification of the longitudinal pitch distribution between the diffraction elements of an existing grating in a manner that varies with length and optionally with time;

implementation of a varying-pitch grating; and/or choosing at will the relationship of pitch variation with length or with time;

with all of the above occurring when the grating in question is already included in an optical fiber or is to be included.

To this end, the present invention provides, in particular, a method of modifying the longitudinal distribution of the pitch of a diffraction grating formed in a deformable optical waveguide, in which method a longitudinally varying stress is applied to said guide so as to modify different gaps of said diffraction grating by different amounts, wherein, to apply said stress to said waveguide, the waveguide is initially securely fixed to an auxiliary part along a carrier line, said auxiliary part having stiffness that is not substantially less than that of the waveguide, and then pitch-modifying deformation is imparted to the auxiliary part to give rise to longitudinally varying amounts of variation in the lengths of segments of said line.

BRIEF DESCRIPTION OF THE DRAWINGS

There follows a more detailed description by way of non-limiting example of how the present invention can be implemented, which description is given with reference to the accompanying diagrammatic figures. When the same element is shown in more than one figure, it is designated in all of them by the same reference symbol.

The figures are equally applicable to steps in methods of the invention for modifying the distribution of the pitch of an existing grating.

Figure 4:
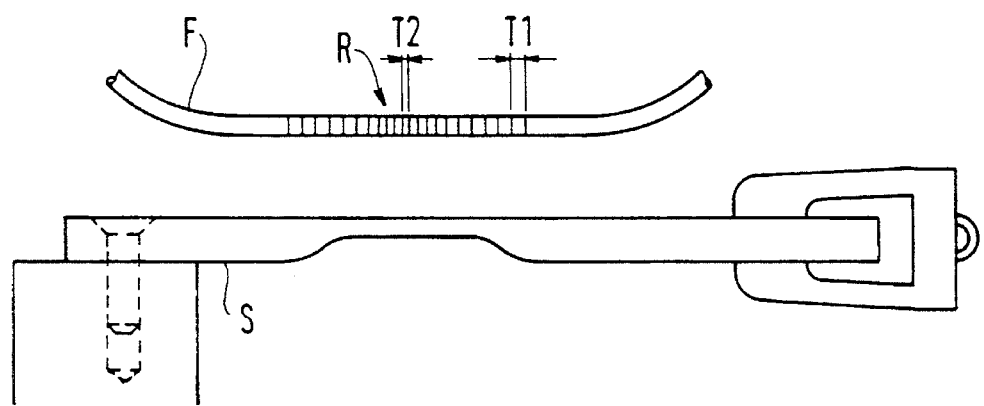
Figure 5:
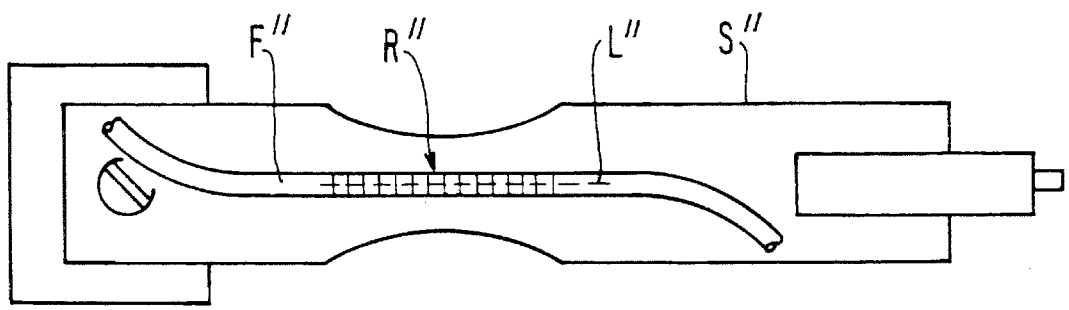
FIGS. 5 and 6 both show one step in second and third implementations, respectively, of the same method.
Figure 6:
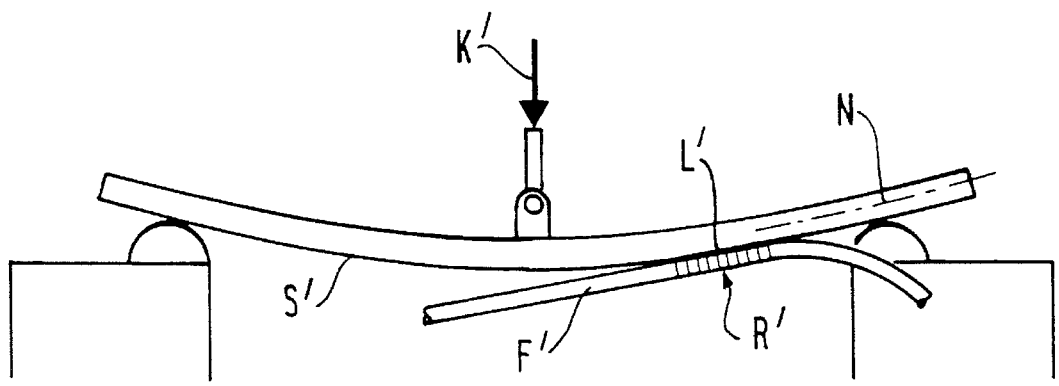

The elements shown in FIGS. 5 and 6 are in one to one correspondence as to function with the elements shown in FIGS. 1 to 4. Each element of FIG. 5 or of FIG. 6 is given the same reference letter as the corresponding element in FIGS. 1 to 4, with a single prime in FIG. 6, so that, for example, the fiber F' of FIG. 6 corresponds to the fiber F of FIGS. 1 to 4, and with a double prime in FIG. 5, so that, for example, the support S" of FIG. 5 corresponds to the support S of FIGS. 1 to 4 and to the support S' of FIG. 6.

MORE DETAILED DESCRIPTION

With reference initially to FIGS. 1 to 4, the present invention makes it possible to modify the pitch distribution of a diffraction grating R. The diffracting elements E of the grating are disposed one after another along a line L of a support S and constituting a carrier line. The elements are secured to said support. As in the context of the first above-mentioned known method, a gap-modifying deformation is imparted to the support to give rise to variations in the lengths of the segments of said line. An elongation coefficient $dl/l$ can thus be defined as being equal to the algebraic value of relative variation in the length of such a segment, i.e. the ratio of a change $dl$ in such a length over said length $l$. A reduction in length is considered as being variation of negative algebraic sign, such that a negative elongation coefficient corresponds to contraction. The elongation coefficient is imposed by the values of defining parameters concerning the support and the deformation. Such parameters concerning the support are its shapes and its dimensions and the mechanical characteristics of the materials from which it is made. Such parameters concerning the deformation define the deformation either directly, i.e. geometrically, or else mechanically via the forces to which they give rise. Given that the diffracting elements are secured relative to the support, deformation of the support modifies the gaps between said elements in proportion to the elongation coefficient. In the first above-mentioned known method, the defining parameters are the section of the fiber carrying the grating, the mechanical characteristics of the silica from which the fiber is made, and the tension force applied to the fiber. According to the present invention, values for said defining parameters K, A1, and A2 are chosen such that the elongation coefficient varies along the carrier line L so that the various gaps T1, T2 of the diffraction grating are modified by different amounts. More precisely, the values of the defining parameters are selected so that pitch distribution is modified in desired amounts. In general, when these amounts have been defined, several choices are available with respect to the defining parameters. Examples of such choices are given below.

In the context of the present invention, the elongation coefficient need not be uniquely defined along the entire length of the carrier line. It is defined at each point along the line. It is equal to the algebraic value of the relative variation $dl/l$ of the length $l$ of a segment including the point, said segment being short enough for its elongation or contraction to be substantially uniform over its entire length.

The invention is more particularly applicable to the case where the diffraction grating is formed in a deformable optical waveguide F, and in particular in an optical fiber. The support S is then constituted by an auxiliary part. The auxiliary part must be deformable, preferably elastically, with stiffness that is greater than that of the waveguide. Said gap-modifying deformation is imparted to the support while the waveguide is securely fixed to the support along the support line L.

As shown in FIG. 6, the deformation may be bending of said auxiliary part S'. Given that any bending of a part causes said part to exhibit a neutral axis N that is subjected to no variation in length, implementation of the present invention requires that the carrier line L' should be selected so as to be offset from said neutral axis.

More specifically, the auxiliary part constitutes a beam S' of longitudinal direction that is substantially parallel to the carrier line L'. Bending is imposed by applying localized transverse forces to said beam, such as K'. It is accompanied by stress which is imposed on the material of the beam and which is of value and direction that varies over the zone under consideration.

The variation in said elongation coefficient thus results from the fact that longitudinal stress varies along the carrier line. The stress is constituted either by a stress value that is purely longitudinal, or else by the longitudinal component of stress that is oblique. It may be in compression or in tension. Persons skilled in the strength-of-materials art are well aware of the mathematical techniques for calculating such stress at each point.

Still more specifically, in the case shown in FIG. 6, the beam S' is horizontal and uniform along its length. It is supported at each end without being fixed and it in turn supports a force K' constituted by the weight of a load applied at an intermediate loading point. The optical fiber F' is stuck to the bottom surface of the beam on one side of said point. The carrier line L' defined by said surface is subjected to longitudinal extension stress which varies longitudinally in linear manner. Variation in the pitch of the grating R' is thus likewise linear assuming that its initial pitch was constant, before the fiber was stuck to the beam.

The amplitude of the variation can be chosen by an appropriate selection of the force K', which selection may possibly vary over time.

In addition, by moving the beam and thus the grating relative to the supports and to the point via which the force K' is applied, this configuration makes it possible to adjust independently the central wavelength of the grating and the gradient of the linear pitch variation.

Figure 1:
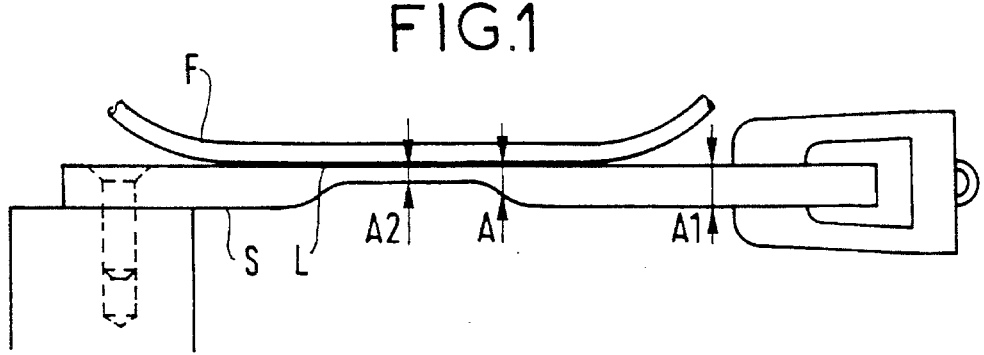
FIGS. 1 to 4 show successive steps in a first implementation of the method of the invention for making a grating.

In another implementation of the present invention, the auxiliary part is in the form of a bar S having its length extending substantially parallel to said carrier line L. The gap-modifying deformation is then modification of said length under the effect of longitudinal traction K applied between the two ends of the bar. The composition of the bar is advantageously constant, with only its section A varying along the length of the carrier line. FIG. 1 shows a section of maximum area A1 and a section of minimum area A2.

In this case, the tension or compression force expressed in Newtons N is constant along the length of the bar. However variation in the section of the bar gives rise to inverse variation in its elongation coefficient. If the deformation is elastic, then the coefficient remains proportional to the stress as expressed in Pascals ($N/m^2$).

More generally, in all cases where the material of the support is of uniform composition and where its temperature is uniform along the length of the carrier line, the variation in elongation coefficient is obtained by varying the local longitudinal stress in the support.

In the example of FIGS. 1 to 5, the longitudinal force applied to the support is constant in the longitudinal direction. The relationship expressing longitudinal variation in the pitch of the grating R is then defined by the relationship expressing variation in the section of the bar S. Nevertheless, the amplitude of the variation is directly proportional to the traction force K and may optionally be modified without changing the bar. In FIGS. 1 to 4, the section of the bar S is varied by varying its thickness.

In FIG. 5, the section of the bar S" is varied by varying the width of the bar by implementing symmetrical cutouts in both sides thereof. This disposition avoids any bending of the bar.

The present invention also relates to a method of making a diffraction grating in a deformable optical waveguide. The method includes the above-described modification method and necessarily comprises the following essential operations:

an inducing operation (FIG. 3) in which the diffraction grating R is formed in the waveguide F at an initial pitch that is different from the final pitch to be achieved; at least one of the initial and final pitches varies longitudinally;

a securing operation (FIG. 1) in which the waveguide is secured to the auxiliary part S along the carrier line L, for example by being stuck thereto, although that is not essential (FIG. 1); and finally, a deformation operation (FIG. 2) which necessarily takes place after the securing operation. It is during this deformation operation that the gap-modifying deformation is imparted to the auxiliary part. This deformation gives rise to longitudinal stresses and to longitudinal dimensional changes in the part and in the waveguide.

Figure 2:
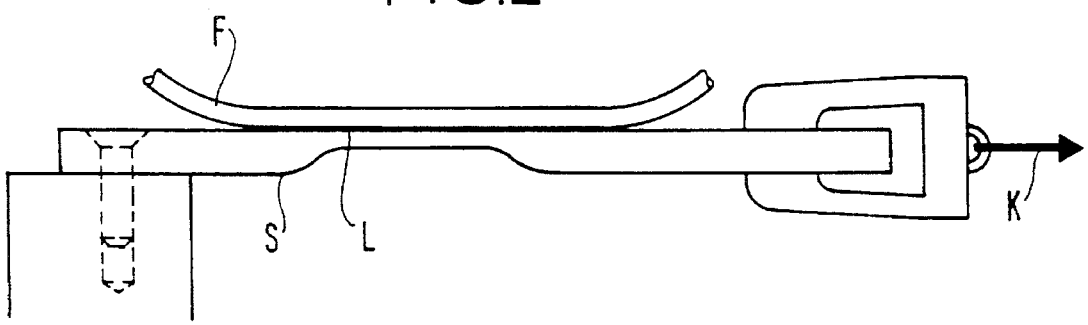
Figure 3:
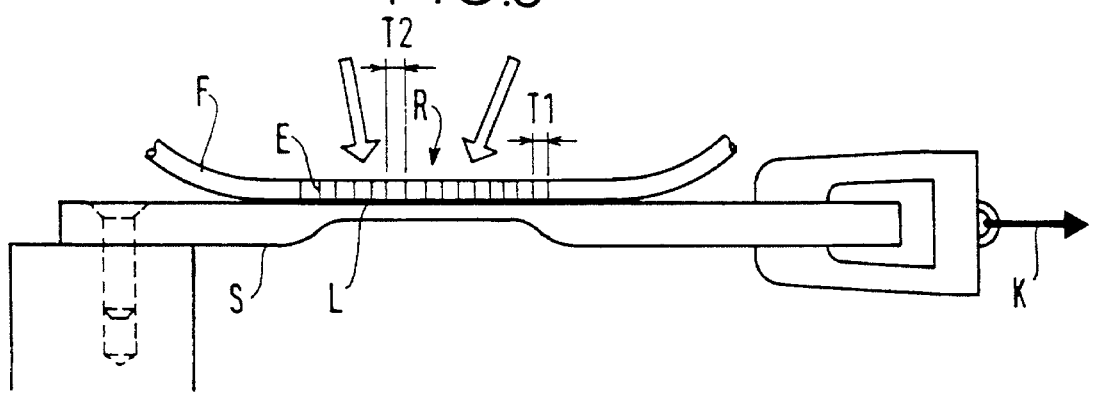

In an embodiment of the method shown in FIGS. 1 to 4, the inducing operation (FIG. 3) is subsequent to the deformation operation (FIG. 2). Under such circumstances, it is followed by a release operation (FIG. 4), thereby releasing the optical waveguide F from said stresses so as to achieve the final pitch.

To perform this release operation, the forces are released that have imposed the modifying deformation to an elastically deformable auxiliary part and/or, as shown in FIG. 4, the waveguide F is separated from the auxiliary part S.

In another implementation of the method, the deformation operation (FIG. 6) takes place after the inducing operation and serves to achieve the final pitch. In use, the grating of the fiber F' remains stuck to the deformed beam S'.

By way of example, the initial pitch of the grating R or R' is longitudinally constant and the present invention makes it possible to achieve pitch that varies longitudinally in compliance with a desired relationship. However, when the inducing operation provides an initial grating that presents interfering longitudinal variation of pitch or phase shifting, the invention makes it possible to achieve a final pitch or phase shifting that is longitudinally constant.

We claim:

1. A method of modifying the longitudinal distribution of the pitch of a diffraction grating formed in a deformable optical waveguide, said method comprising steps of:

providing an auxiliary part having a stiffness that is not substantially less than a stiffness of the waveguide, said auxiliary part being responsive by a deformation thereof to a force applied thereto and being such that said deformation includes longitudinally varying amounts of variation in the lengths of segments of a line of said auxiliary part when said force is suitable therefor, whereby said deformation constitutes a pitch-modifying deformation;

securely fixing the waveguide to said auxiliary part along said line whereby said line constitutes a carrier line; and applying the suitable force to said auxiliary part.

2. A method according to claim 1, said auxiliary part being elastically deformable.

3. A method according to claim 1, said waveguide being an optical fiber.

4. A method according to claim 1, wherein said pitch-modifying deformation is bending of said auxiliary part, said bending causing a neutral axis to appear in said part, said carrier line being selected to be at a distance from said neutral axis.

5. A method according to claim 4, said auxiliary part constituting a beam having a longitudinal direction that is substantially parallel to said carrier line, said bending being imparted by applying localized transverse forces to said beam.

6. A method according to claim 1, wherein said auxiliary part is in the form of a bar having a length that extends substantially parallel to said carrier line, said pitch-modifying deformation being modification in said length under the effect of longitudinal traction applied between the two ends of the bar, the composition of the bar being constant while its section varies along the length of the carrier line.

7. A method according to claim 6, wherein the variation in the section of the bar is obtained by variation in the width of the bar obtained by means of symmetrical cutouts in the two sides thereof.

8. A method of making a diffraction grating in a deformable optical waveguide, the method including the modification method of claim 1, and comprising:

an inducing operation in which said diffraction grating is formed in said waveguide at an initial pitch that is different from a final pitch to be achieved, at least one of said two pitches varying longitudinally;

a securing operation in which said waveguide is securely fixed to said auxiliary part along a said carrier line; and a deformation operation subsequent to the securing operation, and during which said pitch-modifying deformation is imparted to said auxiliary part and establishes linear stresses and linear dimensional modifications in said part and in said waveguide.

9. A method according to claim 8, wherein said inducing operation is subsequent to said deformation operation, and is followed by a release operation which releases said optical waveguide from said stresses so as to achieve said final pitch.

10. A method according to claim 8, wherein said deformation operation is subsequent to said inducing operation, and achieves said final pitch.

* * * * *